(12) United States Patent
Husemann et al.

(10) Patent No.: US 7,923,510 B2
(45) Date of Patent: *Apr. 12, 2011

(54) ADHESIVE SHEET BASED ON NITRILE RUBBER BLENDS FOR ATTACHING METAL PARTS TO PLASTICS

(75) Inventors: Marc Husemann, Hamburg (DE); Frank Hannemann, Hamburg (DE); Matthias Koop, Norderstedt (DE); Thilo Dollase, Hamburg (DE); Thorsten Krawinkel, Hamburg (DE)

(73) Assignee: teas SE, Hamburg (DE)

( * ) Notice: Subject to any disclaimer, the term of this patent is extended or adjusted under 35 U.S.C. 154(b) by 191 days.

This patent is subject to a terminal disclaimer.

(21) Appl. No.: 11/996,519

(22) PCT Filed: Jul. 27, 2006

(86) PCT No.: PCT/EP2006/064714
§ 371 (c)(1),
(2), (4) Date: Mar. 26, 2008

(87) PCT Pub. No.: WO2007/012656
PCT Pub. Date: Feb. 1, 2007

(65) Prior Publication Data
US 2008/0166554 A1    Jul. 10, 2008

(30) Foreign Application Priority Data

Jul. 28, 2005    (DE) .......................... 10 2005 035 905

(51) Int. Cl.
| C08L 9/02 | (2006.01) |
| C08L 61/04 | (2006.01) |
| C08L 61/14 | (2006.01) |
| C08L 63/00 | (2006.01) |
| C08L 63/02 | (2006.01) |
| C08L 63/04 | (2006.01) |
| C08L 75/04 | (2006.01) |

(52) U.S. Cl. ......... 525/108; 525/105; 525/125; 525/155
(58) Field of Classification Search .................. None
See application file for complete search history.

(56) References Cited

U.S. PATENT DOCUMENTS

| 4,725,637 A | 2/1988 | Fernyhough et al. |
| 4,923,727 A * | 5/1990 | Maruyama et al. .......... 428/40.8 |
| 6,054,509 A * | 4/2000 | Arai et al. ..................... 523/428 |
| 6,586,089 B2 * | 7/2003 | Golden ......................... 428/346 |
| 6,602,958 B2 * | 8/2003 | Briggs et al. .................. 525/192 |
| 7,569,640 B2 * | 8/2009 | Husemann et al. ........... 525/238 |
| 2008/0115888 A1 * | 5/2008 | Husemann et al. ......... 156/307.5 |

FOREIGN PATENT DOCUMENTS

| JP | 10-81858 A | * | 3/1998 |
| JP | 2001-288301 A | * | 10/2001 |
| WO | 01 94493 A2 | | 12/2001 |
| WO | 2004 094550 A | | 11/2004 |
| WO | 2005 063909 A | | 7/2005 |

* cited by examiner

*Primary Examiner* — Robert Sellers
(74) *Attorney, Agent, or Firm* — Norris McLaughlin & Marcus, P.A.

(57) ABSTRACT

Heat-activable adhesive sheet of an adhesive comprising a blend of at least three synthetic nitrile rubber compositions S1, S2 and S3, each of which comprises at least one synthetic nitrile rubber, and at least one reactive resin which is capable of crosslinking with itself, with other reactive resins and/or with the nitrile rubbers of synthetic rubber compositions S1, S2 and S3, in which a) the blend of the heat-activable sheet being microphase-separated, characterized by at least three different glass transition temperatures in a DSC, b) at least one of said glass transition temperatures being greater than 10° C. and at least one of said glass transition temperature lower than −20° C., c) the nitrile rubber or rubbers S1 having an acrylonitrile fraction of greater than/equal to 35%, d) the nitrile rubber or rubbers S2 having an acrylonitrile fraction of greater than 25% and less than 35%, e) the nitrile rubber S3 having an acrylonitrile fraction of less than/equal to 25%.

7 Claims, 2 Drawing Sheets

ADHESIVE SHEET BASED ON NITRILE RUBBER BLENDS FOR ATTACHING METAL PARTS TO PLASTICS

This is a 371 of PCT/EP2006/064714 filed 27 Jul. 2006 (international filing date).

The invention relates to a blend of at least three nitrile rubbers, differing in composition, and a reactive resin for bonding metal parts adhesively to plastics in portable consumer electronics articles which subsequent to bonding have high bond strength and shock resistance even at low temperatures below −15° C.

BACKGROUND OF THE INVENTION

The adhesive bonding of metal parts to plastics is typically effected using double-sided pressure-sensitive adhesive tapes. The adhesive forces required for this purpose are enough to attach and fasten the metal components to the plastics. Metals used are typically steel, including stainless steel, and aluminum. Plastics used are, for example, PVC, ABS, PC or blends based on these plastics. For portable consumer electronics articles, however, the requirements are continually rising. On the one hand these articles are becoming ever smaller, and so the bond areas too automatically become smaller. On the other hand, the bond must also meet additional requirements, since portable articles are employed across a very large temperature range and, moreover, may be exposed to dropping. These requirements are particularly problematic for metal bonds to plastics. In the event of a drop, the plastic may absorb some of the energy, whereas metals do not deform at all. In this case the adhesive tape has to absorb a large part of the energy. This can be done particularly efficiently through the use of heat-activatable sheets, which are able to develop a particularly high adhesive force following activation. For mediation of adhesive qualities (for the formation of an adhesive layer), heat-activatable adhesive sheets require the application of heat and in general—as in the case of all pressure-sensitive adhesives or self-adhesive compositions that are sensitive to pressure—require a certain application of pressure (and should not, therefore, be confused with thermosetting reactive adhesives, which cure when heat is supplied and cannot therefore be considered self-adhesive compositions).

Heat-activatable adhesives can be divided into two categories:
a) thermoplastic heat-activatable sheets
b) reactive heat-activatable sheets.

Thermoplastic heat-activatable sheets have already been known for a long time and are based, for example, on polyesters or copolyamides. Commercial examples thereof are 3M 615, 3M 615S or tesa 8440. For application in portable consumer electronics articles, however, these thermoplastic heat-activatable sheets also have disadvantages. This relates in particular to the oozing behavior under pressure and temperature application, since diecuts are always processed in the application, and then alter their shape.

It is also possible to use reactive heat-activatable sheets. These possess significantly better dimensional stability if the elastomeric component has a high elasticity. Moreover, the reactive resins allow a crosslinking reaction to occur that significantly increases the bond strength. For this bonding, accordingly, it is possible to use, for example, heat-activatable sheets based on nitrile rubbers and phenolic resins, as available commercially, for example, through tesa 8401. A disadvantage of these reactive heat-activatable sheets, however, is the dependence of the bond strength on the curing conditions. Particularly exacting requirements are imposed here, since consumer electronics devices are manufactured in massive numbers and hence the individual components are produced in very short cycle times.

The high flow viscosity of the nitrile rubber gives the heat-activatable sheet a high dimensional stability and, as a result of the crosslinking reaction, allows high adhesive forces on metals and plastics. The high dimensional stability and low flow capacity, however, also possess disadvantages: as a result of the high strength, the heat-activatable sheet hardens very quickly at low temperatures and becomes brittle, with the result that at very low temperatures the bond becomes shock-sensitive and cracks.

Success has not hitherto been achieved, unfortunately, in producing a heat-activatable sheet in a form such that the bond strength is very high at both high and low temperatures and hence allows a very wide temperature range to be covered.

In the light of this prior art, the object on which the invention is based is that of providing a heat-activatable adhesive sheet for attaching metal parts to plastics for portable consumer electronics articles which withstands a cold shock test at −20° C. and features a high bonding strength in a temperature range from −20° C. to +50° C.

SUMMARY OF THE INVENTION

In accordance with the invention this object is achieved by means of a heat-activatable adhesive sheet furnished with an adhesive comprising a blend of at least three synthetic nitrile rubbers S1, S2, and S3 and at least one reactive resin which is capable of crosslinking with itself, with other reactive resins and/or with the nitrile rubbers S1, S2 and S3, in which
a) the blend of the heat-activatable sheet is microphase-separated, characterized by at least three different glass transition temperatures in the DSC
b) the blend of the heat-activatable sheet has at least 3 glass transition temperatures, at least one glass transition temperature being greater than 10° C. and one glass transition temperature being less than −20° C.
c) the nitrile rubber or rubbers S1 have an acrylonitrile fraction of greater than or equal to 35%
d) the nitrile rubber or rubbers S2 have an acrylonitrile fraction of greater than 25% and less than 35%
e) the nitrile rubber or rubbers S3 have an acrylonitrile fraction of less than or equal to 25%.

Owing to the incompatibility that generally exists between different polymers, these polymers, after having been physically mixed beforehand, undergo a greater or lesser degree of separation. More or less homogeneous regions comprising the individual macromolecules are formed. The result is that so-called domains (phases) are formed in which two or more polymers of the same kind ("compatible" polymers) congregate. If the domains are of the same order of magnitude as the original polymers, the term "microphase separation" is used.

DETAILED DESCRIPTION

Figure 1:
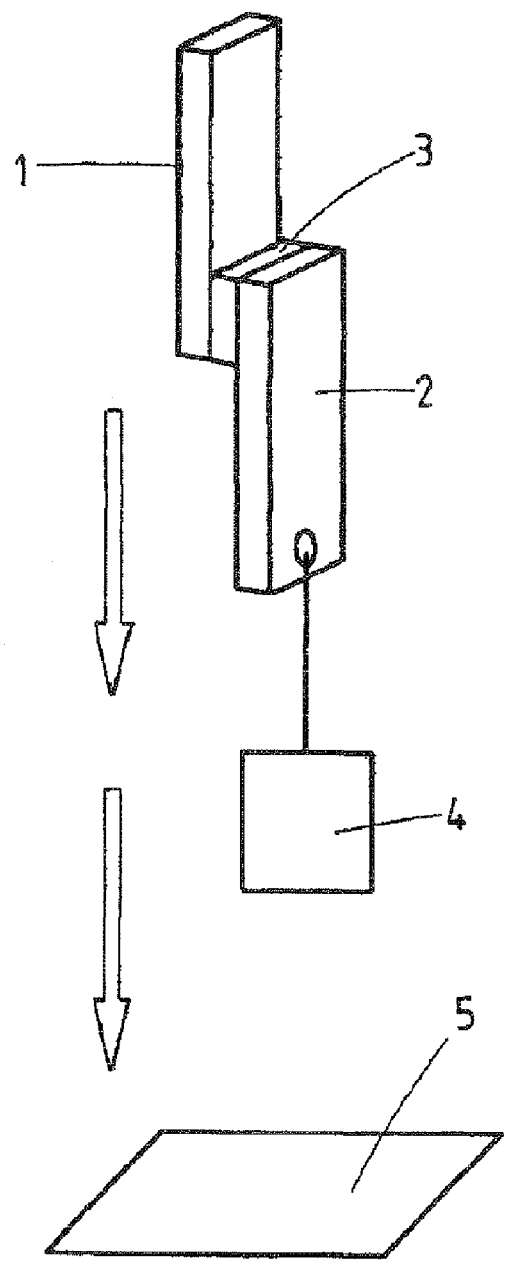
FIG. 1 illustrates the drop test.

In one preferred version of the invention the inventive composition possesses a drop height as measured by test method A of greater than 1 m at RT and of greater than 25 cm at −20° C. and/or a bond strength as measured by test method B of greater than 2 N/mm² at room temperature and of greater than 3 N/mm² at −20° C.

The inventive mixing of the blend produces an improvement in the technical adhesive properties at low and at high temperatures.

The microphase separation and the formation of 3 glass transition temperatures (at very low temperatures (less than −20° C.) and at high temperatures (>10° C.) assisted by a broadly distributed middle glass transition temperature) produces an advantageous interaction of the technical adhesive properties of the individual components. The domains with the low glass transition temperature raise the low-temperature impact strength and the adhesion at low temperatures, while the domains at high temperatures maintain the bond strength at high temperatures and the dimensional stability of the diecuts under pressure and at temperature.

The glass transition temperatures indicated here correspond to those obtained from quasi-steady-state experiments, such as, for example, differential scanning calorimetry, DSC.

The weight fraction of the nitrile rubber or rubbers S1 is preferably between 5% and 50% by weight, based on the total nitrile rubber fraction.

The weight fraction of the nitrile rubber or rubbers S2 is preferably between 10% and 90% by weight, based on the total nitrile rubber fraction.

The weight fraction of the nitrile rubber or rubbers S3 is preferably between 5% and 50% by weight, based on the total nitrile rubber fraction.

For the adhesive bonding of the metal parts to the plastics, heat-activatable sheets are used with a layer thickness between 25 and 300 µm, in one particularly preferred embodiment a layer thickness of 50 to 250 µm, depending on surface roughness, curvature or size.

The adhesive used for the heat-activatable adhesive sheet of the invention is composed of a blend of at least three nitrile rubbers S1, S2, and S3.

Nitrile Rubbers S1

Nitrile-butadiene rubbers are available as Europrene™ from Eni Chem, or as Krynac™ and Perbunan™ from Bayer, or as Breon™ and Nipol N™ from Zeon. Hydrogenated nitrile-butadiene rubbers are available as Therban™ from Bayer and as Zetpol™ from Zeon. Nitrile-butadiene rubbers are polymerized either hot or cold. The nitrile rubbers S1 have an acrylonitrile fraction of greater than 35%. In order to avoid complete phase separation, however, the acrylonitrile fraction ought to be less than 60%, again based on the total fraction of S1. A further criterion is the glass transition temperature of the nitrile rubbers S1. In order to achieve microphase separation, the static glass transition temperature in the DSC ought in one preferred embodiment to be greater than/equal to −20° C., more preferably greater than −15° C. Another criterion for the nitrile rubber S1 is the Mooney viscosity. Since it is necessary to ensure high flexibility at low temperatures, the Mooney viscosity ought to be below 120 (Mooney ML 1+4 at 100° C.). Commercial examples of such nitrile rubbers include Nipol™ 40-5 from Zeon Chemicals.

Nitrile Rubbers S2

Nitrile-butadiene rubbers are available as Europrene™ from Eni Chem, or as Krynac™ and Perbunan™ from Bayer, or as Breon™ and Nipol N™ from Zeon. Hydrogenated nitrile-butadiene rubbers are available as Therban™ from Bayer and as Zetpol™ from Zeon. Nitrile-butadiene rubbers are polymerized either hot or cold. The nitrile rubbers S2 have an acrylonitrile fraction of less than 35% and greater than 25%. A further criterion is the glass transition temperature of the nitrile rubbers S2. In order to achieve microphase separation, the static glass transition temperature in the DSC ought in one preferred embodiment to be less than −20° C., more preferably less than −25° C. Another criterion for the nitrile rubber S2 is the Mooney viscosity. Since it is necessary to ensure high flexibility at low temperatures, the Mooney viscosity ought to be below 100 (Mooney ML 1+4 at 100° C.). Commercial examples of such nitrile rubbers include Breon™ N33C50 from Zeon Chemicals.

Nitrile Rubbers S3

Nitrile-butadiene rubbers are available as Europrene™ from Eni Chem, or as Krynac™ and Perbunan™ from Bayer, or as Breon™ and Nipol N™ from Zeon. Hydrogenated nitrile-butadiene rubbers are available as Therban™ from Bayer and as Zetpol™ from Zeon. Nitrile-butadiene rubbers are polymerized either hot or cold. The nitrile rubbers S3 have an acrylonitrile fraction of less than 25%. In order to avoid complete phase separation, however, the acrylonitrile fraction ought to be greater than 4%, again based on the total fraction of S3. A further criterion is the glass transition temperature of the nitrile rubbers S3. In order to achieve microphase separation, the static glass transition temperature in the DSC ought in one preferred embodiment to be less than/equal to −35° C., more preferably less than −40° C. Another criterion for the nitrile rubber S3 is the Mooney viscosity. Since it is necessary to ensure high flexibility at low temperatures, the Mooney viscosity ought to be below 100 (Mooney ML 1+4 at 100° C.). Commercial examples of such nitrile rubbers include Nipol™ 1034-60 from Zeon Chemicals.

Reactive Resins

In accordance with the invention reactive resins are added to the nitrile rubber blend. Reactive resins are resins containing functional groups which when activated—more particularly, when thermally activated—are able to enter into chemical reactions. The reactive resins used in accordance with the invention are capable more particularly of crosslinking with themselves, with other reactive resins and/or with the nitrile rubbers S1, S2, and S3.

In contradistinction thereto, nonreactive resins, which may be added as additives, form a substantially physical mixture with the adhesive and remain so even on activation, and may, for example, critically influence the viscoelastic properties.

The fraction of the reactive resins (and, where appropriate, of other, nonreactive resins added; see later on below) is between 75% and 30% by weight, based on the total mixture of nitrile rubber blend and reactive resin.

One very preferred group of reactive resins to be used comprises epoxy resins. The molecular weight $M_w$ of the epoxy resins which can be outstandingly employed is more particularly from 100 g/mol up to a maximum of 10 000 g/mol for polymeric epoxy resins.

Epoxy resins which can be employed outstandingly comprise, for example, epichlorohydrin, glycidyl esters, the reaction product of epichlorohydrin and p-aminophenol, and the reaction product of bisphenol A and epichlorohydrin.

Preferred commercial examples include Araldite™ 6010, CY-281™, ECN™ 1273, ECN™ 1280, MY 720, RD-2 from Ciba Geigy, DER™ 331, DER™ 732, DER™ 736, DEN™ 432, DEN™ 438, DEN™ 485 from Dow Chemical, Epon™ 812, 825, 826, 828, 830, 834, 836, 871, 872, 1001, 1004, 1031, etc., from Shell Chemical, and HPT™ 1071, HPT™ 1079, likewise from Shell Chemical.

Examples of advantageous commercial aliphatic epoxy resins include vinylcyclohexane dioxides, such as ERL-4206, ERL-4221, ERL 4201, ERL-4289 or ERL-0400 from Union Carbide Corp.

Examples of novolak resins which can be used include Epi-Rez™ 5132 from Celanese, ESCN-001 from Sumitomo Chemical, CY-281 from Ciba Geigy, DEN™ 431, DEN™ 438, Quatrex 5010 from Dow Chemical, RE 305S from Nippon Kayaku, Epiclon™ N673 from DaiNippon Ink Chemistry, or Epikote™ 152 from Shell Chemical.

As reactive resins it is also possible, furthermore, to use melamine resins outstandingly, such as Cymel™ 327 and 323 from Cytec, for example.

As reactive resins it is also possible, furthermore, to make favorable use of terpene-phenolic resins, such as Nirez™ 2019 from Arizona Chemical, for example.

As reactive resins it is also possible, furthermore, to make advantageous use of phenolic resins, such as YP 50 from Toto Kasei, PKHC from Union Carbide Corp., and BKR 2620 from Showa Union Gosei Corp., for example. With further advantage it is also possible as reactive resins to use phenolic resole resins in combination with other phenolic resins.

As reactive resins it is also possible, furthermore, advantageously to use polyisocyanates, such as Coronate™ L from Nippon Polyurethan Ind., Desmodur™ N3300 or Mondur™ 489 from Bayer, for example.

In order to accelerate the reaction between the two components it is possible optionally, in an advantageous procedure, to additize the blend with crosslinkers and accelerants.

Examples of suitable accelerants include imidazoles, available commercially as 2M7, 2E4MN, 2PZ-CN, 2PZ-CNS, P0505, L07N from Shikoku Chem. Corp. or Curezol 2MZ from Air Products. As crosslinkers, furthermore, HMTA (hexamethylenetetramine) additions are suitable.

Furthermore, it is also possible to employ amines, especially tertiary amines, for acceleration.

Further Additives

In order to optimize the technical adhesive properties and the range of activation it is possible, optionally, to add bond strength enhancer resins or further reactive resins. Tackifying resins for addition include, without exception, all tackifier resins already known and described in the literature. Representatives include the pinene resins, indene resins, and rosins, their disproportionated, hydrogenated, polymerized, and esterified derivatives and salts, the aliphatic and aromatic hydrocarbon resins, terpene resins and terpene-phenolic resins, and also C5, C9, and other hydrocarbon resins. Any combinations of these and further resins may be used in order to adjust the properties of the resulting adhesive in accordance with requirements. Generally speaking, any resins that are compatible (soluble) with the rubbers S1 and S2 can be employed; reference may be made in particular to all aliphatic, aromatic, and alkylaromatic hydrocarbon resins, hydrocarbon resins based on pure monomers, hydrogenated hydrocarbon resins, functional hydrocarbon resins, and natural resins. Express reference is made to the depiction of the state of the art in the "Handbook of Pressure Sensitive Adhesive Technology" by Donatas Satas (van Nostrand, 1989).

As well as reactive resins it is also possible to use plasticizers. Here, in one preferred embodiment of the invention, plasticizers can be used that are based on polyglycol ethers, polyethylene oxides, phosphate esters, aliphatic carboxylic esters, and benzoic esters. It is also possible, furthermore, to employ aromatic carboxylic esters, high molecular mass diols, sulfonamides, and adipic esters.

It is additionally possible as an option to add fillers (e.g., fibers, carbon black, zinc oxide, titanium dioxide, chalk, solid or hollow glass beads, microspheres of other materials, silica, silicates), nucleators, expandants, adhesion-reinforcing additives, and thermoplastics, compounding agents and/or aging inhibitors, in the form for example of primary and secondary antioxidants or in the form of light stabilizers.

In a further preferred embodiment, further additives are added to the blend, such as, for example, polyvinylformal, polyacrylate rubbers, chloroprene rubbers, ethylene-propylene-diene rubbers, methyl-vinyl-silicone rubbers, fluorosilicone rubbers, tetrafluoroethylene-propylene copolymer rubbers, butyl rubbers, and styrene-butadiene rubbers.

Polyvinylbutyrals are available as Butvar™ from Solucia, as Pioloform™ from Wacker, and as Mowital™ from Kuraray. Polyacrylate rubbers are available as Nipol AR™ from Zeon. Chloroprene rubbers are available as Baypren™ from Bayer. Ethylene-propylene-diene rubbers are available as Keltan™ from DSM, as Vistalon™ from Exxon Mobil, and as Buna EP™ from Bayer. Methyl-vinyl-silicone rubbers are available as Silastic™ from Dow Corning and as Silopren™ from GE Silicones. Fluorosilicone rubbers are available as Silastic™ from GE Silicones. Butyl rubbers are available as Esso Butyl™ from Exxon Mobil. Styrene-butadiene rubbers are available as Buna S™ from Bayer, as Europrene™ from Eni Chem, and as Polysar S™ from Bayer.

Polyvinylformals are available as Formvar™ from Ladd Research.

In a further preferred embodiment, further additives are added to the blend, such as, for example, thermoplastic materials from the group of the following polymers: polyurethanes, polystyrene, acrylonitrile-butadiene-styrene terpolymers, polyesters, unplasticized polyvinyl chlorides, plasticized polyvinyl chlorides, polyoxymethylenes, polybutylene terephthalates, polycarbonates, fluorinated polymers, such as polytetrafluoroethylene, for example, polyamides, ethylene-vinyl acetates, polyvinyl acetates, polyimides, polyethers, copolyamides, copolyesters, polyolefins, such as polyethylene, polypropylene, polybutene, polyisobutene, and poly(meth)acrylates, for example.

The adhesive force of the heat-activatable sheet can be enhanced by further purposive additizing. Thus it is possible, for example, to use polyimine copolymers or polyvinyl acetate copolymers as additions which promote adhesive force.

Preparation Processes

The blends for the heat-activatable adhesive sheet of the invention can be prepared from solution or in the melt. To prepare the blend in solution it is preferred to use solvents in which at least one of the components enjoys good solubility. To prepare the mixture the known stirring assemblies, such as compounders, are used. For this purpose it may also be necessary to introduce heat. The blends are subsequently coated from solution or from the melt. After coating from solution, the solvent is removed in a drying tunnel. For coating from the melt, the solvent is removed from the blend beforehand. In one preferred embodiment the solvent is stripped off in a concentrating extruder under reduced pressure, which can be done using, for example, single-screw or twin-screw extruders, which preferably distil off the solvent in different or identical vacuum stages and which possess a feed preheater. Coating then takes place via a melt die or an extrusion die, the adhesive film being stretched if desired, in order to achieve the optimum coating thickness.

In a further embodiment of the invention the blend is prepared in the melt. Mixing of the resins can be carried out using a compounder or a twin-screw extruder, or a planetary roller extruder.

Coating then takes place again from the melt. Coating takes place via a melt die or an extrusion die, with the adhesive film being stretched if desired, in order to achieve the optimum coating thickness.

Backing materials used for the blend are the typical materials familiar to the skilled worker, such as films (polyesters, PET, PE, PP, BOPP, PVC, polyimide), nonwovens, foams, fabrics, and woven films, and also release paper (glassine, HDPE, LDPE). The backing materials ought to have been furnished with a release coat. In one very preferred embodiment of the invention the release coat is composed of a silicone release lacquer or of a fluorinated release lacquer. In one preferred embodiment the heat-activatable adhesive is coated directly onto a release paper and then used further as a transfer tape. To produce relatively large coat thicknesses it may also be of advantage to laminate two or more layers of adhesive together. This is done with particular preference under introduced heat and pressure.

EXAMPLES

Figure 3:
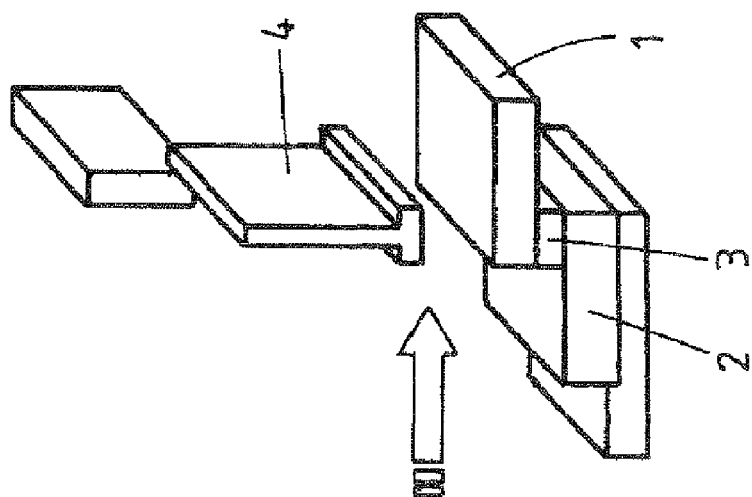
FIG. 3 illustrates the preparation of samples for the drop test and bond test.
Figure 3:
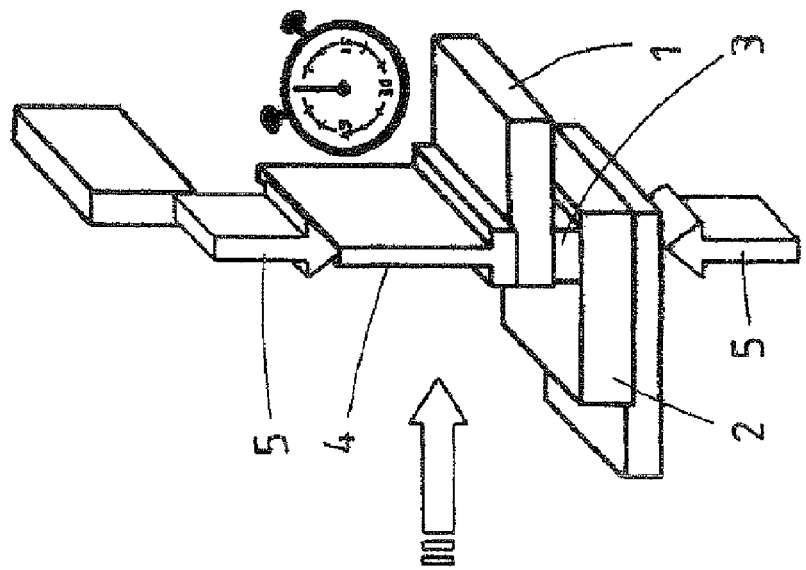
Figure 3:
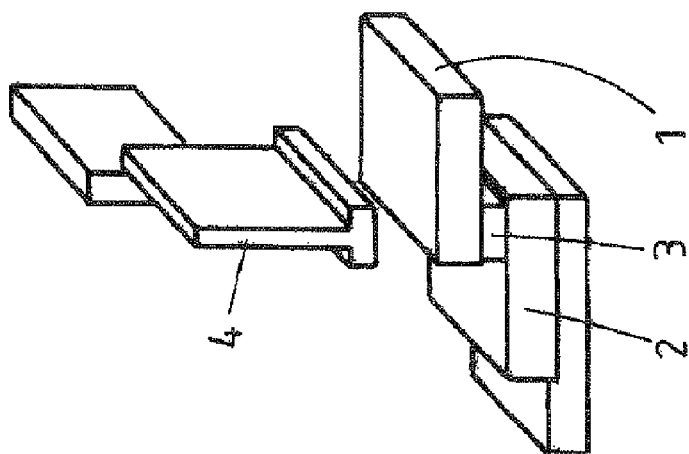

Test Methods
Drop Test A) (see FIGS. 1 and 3)

The bond area is 2 cm². A plate (1) of aluminum 1.5 mm thick and 2 cm wide is joined to a polycarbonate (PC) plate (2) 2 cm wide and 3 mm thick using an inventive heat-activatable adhesive sheet (3).

In a first step a heat-activatable sheet 200 µm thick is laminated to the aluminum with the aid of a 95° C. hotplate. Subsequently the release sheet is removed. The test specimens are bonded in a heating press (cf. FIG. 3; 1=aluminum plate, 2=polycarbonate plate, 3=heat-activatable adhesive sheet, 4=press ram, 5=pressure), heating taking place via the Al side. Heat activation is carried out with a 180° C. heating-press ram at a pressure of 5 bar for a pressing time of 5 s.

Subsequently the drop test is carried out (arrows in the figure: direction of drop). A 50 g weight (4) is attached to the PC plate. The whole assembly is then dropped from different heights onto a steel plate (5). A determination is made of the height at which the bond with the heat-activatable sheet is still able to absorb the impact and the Al/PC test specimens do not fall apart. The test is additionally carried out at different temperatures as well.

Figure 2:
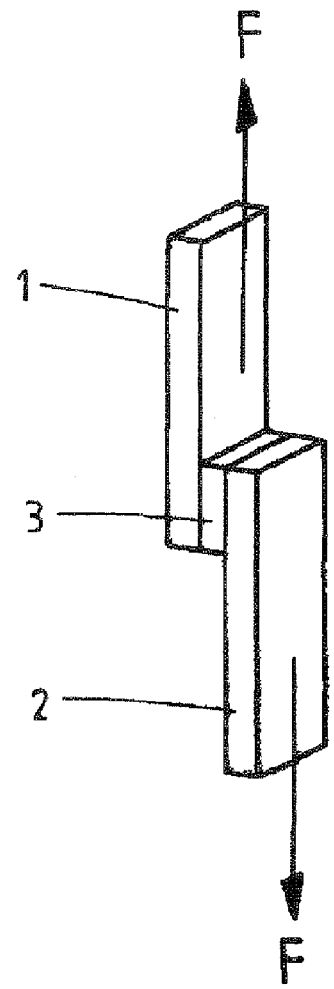
FIG. 2 illustrates the bond strength test.

Bond strength B) (see FIGS. 2 and 3)

The bond strength is determined by means of a dynamic shear test (cf. FIG. 2). The bond area is 2 cm². A plate (1) of Al 1.5 mm thick and 2 cm wide is joined to a PC plate (2) 2 cm wide and 3 mm thick using an inventive heat-activatable adhesive sheet (3).

In a first step a heat-activatable sheet 200 µm thick is laminated to the aluminum with the aid of a 95° C. hotplate. Subsequently the release sheet is removed. The test specimens are bonded in a heating press (cf. FIG. 3; 1=aluminum plate, 2=polycarbonate plate, 3=heat-activatable adhesive sheet, 4=press ram, 5=pressure), heating taking place via the Al side. Heat activation is carried out using a 180° C. heating-press ram at a pressure of 5 bar for a pressing time of 5 s.

Subsequently the test specimens are pulled apart with a Zwick machine at 10 mm/min, using the slowly increasing force F. The measured unit is expressed in N/mm² and is the maximum force measured in separating the test specimens (aluminum and polycarbonate) from one another. The measurement is carried out at different temperatures:
−20° C., 0% humidity
23° C., 50% humidity
50° C., 50% humidity The measurements are made immediately after pressing and heat activation, waiting for about 30 minutes for acclimatization to the respective temperature range.

Cellphone Test C)

The heat-activatable sheet is used with a thickness of 200 µm for bonding an aluminum trim piece to a polycarbonate cellphone casing. The bond area is approximately 4 cm². Bonding is carried out using a heating press at 180° C. and 5 bar with a 5-second cure time. After 24 h the cellphone shells are cooled, after bonding, to −20° C. The test specimens are then twisted counter to one another at this temperature.

Molecular Weight Determination

The average molecular weights $M_w$ (weight averages) were determined by gel permeation chromatography in accordance with the following parameters:

Eluent: THF/0.1% by volume trifluoroacetic acid
Precolumn: PSS-SDV, 10µ, ID 8.0 mm×50 mm
Column: PSS-SDV, 10µ linear one, ID 8.0 mm×300 mm
Pump TSP P 100
Flow rate: 0.5 ml/min
Sample concentration: 1.5 g/l
Injection system: TSP AS 3000 with 100 µl injection volume
Temperature: 25° C.
Detector: Shodex RI 71

Measurement was carried out against toluene as the internal standard.

Calibration was carried out using polystyrene standards in the column's separating range; utilizing the known Mark Houwink coefficients a and K, the polystyrene calibration was converted universally into a PMMA calibration.

The molar mass averages and their distribution were calculated by means of the strip method (WinGPC Version 6.20) with computer assistance, based on the universal (PMMA) calibration.

All of the figures reported are "PMMA molar mass equivalents".

Reference Example 1

50% by weight of Breon N36 C80 (nitrile rubber) from Zeon, 40% by weight of phenolic novolak resin Durez 33040 blended with 8% of HMTA (Rohm and Haas) and 10% by weight of phenolic resole resin 9610 LW from Bakelite were prepared as a 30% strength solution in methyl ethyl ketone in a compounder. The kneading time was 20 h. The heat-activatable adhesive was subsequently coated from solution onto a glassine release paper and dried at 100° C. for 10 minutes. The coat thickness after drying was 100 µm. Two such plies were then laminated together using a roll laminator at 100° C. Thereafter the coat thickness was 200 µm.

Reference Example 2

50% by weight of Nipol N1094-80 (nitrile rubber) from Zeon, 40% by weight of phenolic novolak resin Durez 33040 blended with 8% of HMTA (Rohm and Haas) and 10% by weight of phenolic resole resin 9610 LW from Bakelite were prepared as a 30% strength solution in methyl ethyl ketone in a compounder. The kneading time was 20 h. The heat-activatable adhesive was subsequently coated from solution onto a glassine release paper and dried at 100° C. for 10 minutes. The coat thickness after drying was 100 µm. Two such plies were then laminated together using a roll laminator at 100° C. Thereafter the coat thickness was 200 µm.

Example 3

17% by weight of Nipol 40-5 (nitrile rubber) from Zeon, 17% by weight of Breon N33C50 (nitrile rubber) from Zeon, 16% by weight of Nipol 1034-60 (nitrile rubber) from Zeon, 40% by weight of phenolic novolak resin Durez 33040 blended with 8% of HMTA (Rohm and Haas) and 10% by weight of phenolic resole resin 9610 LW from Bakelite were prepared as a 30% strength solution in methyl ethyl ketone in a compounder. The kneading time was 20 h. The heat-activatable adhesive was subsequently coated from solution onto a glassine release paper and dried at 100° C. for 10 minutes. The coat thickness after drying was 100 μm. Two such plies were then laminated together using a roll laminator at 100° C. Thereafter the coat thickness was 200 μm.

Example 4

10% by weight of Nipol 40-5 (nitrile rubber) from Zeon, 15% by weight of Breon N33C50 (nitrile rubber) from Zeon, 30% by weight of Nipol 1034-60 (nitrile rubber) from Zeon, 45% by weight of phenolic novolak resin Durez 33040 blended with 8% of HMTA (Rohm and Haas) and 10% by weight of phenolic resole resin 9610 LW from Bakelite were prepared as a 30% strength solution in methyl ethyl ketone in a compounder. The kneading time was 20 h. The heat-activatable adhesive was subsequently coated from solution onto a glassine release paper and dried at 100° C. for 10 minutes. The coat thickness after drying was 100 μm. Two such plies were then laminated together using a roll laminator at 100° C. Thereafter the coat thickness was 200 μm.

Results:

The inventive heat-activatable adhesive sheets 3 and 4 were tested in the same way with two reference examples 1 and 2. Reference example 1 represents a heat-activatable sheet based on a nitrile rubber having a high acrylonitrile fraction (36%). Reference example 2 is based on a nitrile rubber having a low acrylonitrile fraction of 23%. All examples were used under identical curing conditions to bond aluminum to polycarbonate (PC)—an application occurring frequently, for example, in the manufacture of cellphones. After adhesive bonding, the specimens were subjected to a drop test. The results are set out in table 1. The respective drop height is reported in cm.

TABLE 1

| Examples | Test method A at rt | Test method A at −20° C. |
| --- | --- | --- |
| Reference 1 | >150 cm | 8 cm |
| Reference 2 | >150 cm | 15 cm |
| 3 | >200 cm | 70 cm |
| 4 | >200 cm | 80 cm |

From table 1 it is apparent that inventive examples 3 and 4 have a significantly better cold shock sensitivity at −20° C., which is reflected in turn in the higher drop height that is possible. At room temperature, all of the examples exhibit high resistance to shock.

Furthermore, the bond strengths were measured for the examples at different temperatures. Again, the bonding/curing conditions were held constant for all the examples. The results are set out in table 2.

TABLE 2

| Examples | Test method B at rt | Test method B at +50° C. | Test method B at −20° C. |
| --- | --- | --- | --- |
| Reference 1 | 4.3 N/mm$^2$ | 1.5 N/mm$^2$ | 4.8 N/mm$^2$ |
| Reference 2 | 3.9 N/mm$^2$ | 1.0 N/mm$^2$ | 5.5 N/mm$^2$ |

TABLE 2-continued

| Examples | Test method B at rt | Test method B at +50° C. | Test method B at −20° C. |
| --- | --- | --- | --- |
| 3 | 3.9 N/mm$^2$ | 0.8 N/mm$^2$ | 7.0 N/mm$^2$ |
| 4 | 4.1 N/mm$^2$ | 0.8 N/mm$^2$ | 7.3 N/mm$^2$ |

From table 2 it is apparent that at low temperatures in particular the bond strength is greatest for inventive examples 3 and 4. This illustrates the fact that, in conjunction with the outstanding low-temperature impact strength, the inventive examples exhibit a significantly better low-temperature behavior.

At room temperature and +50° C., reference example 1 has the highest values, since this example is based only on a nitrile rubber having a high acrylonitrile fraction and therefore exhibits the lowest flow behavior in the dynamic shear test. The differences between this and inventive examples 3 and 4, and between this and reference example 2, however, are relatively minor.

In a final test, a cellphone shell was bonded to an aluminum trim piece for relevance to actual practice. The cellphone shell was then twisted at −20° C. In the case of reference examples 1 and 2, the bond opened up very easily. Inventive examples 3 and 4, in contrast, could be twisted at these low temperatures without problems, and hence exhibit a significantly better adhesive performance at low temperature. At room temperature, in contrast, all four examples showed trouble-free performance and a high level of adhesion.

We claim:

1. A heat-activatable adhesive sheet of an adhesive comprising a blend of at least three synthetic nitrile rubber compositions S1, S2, and S3, each of which comprises at least one synthetic nitrile rubber, and at least one reactive resin which is capable of crosslinking with itself, with other reactive resins and/or with the nitrile rubbers of synthetic rubber compositions S1, S2, and S3, in which:
   a) the nitrile rubber blend is microphase-separated, characterized by at least three different glass transition temperatures in a DSC (dynamic scanning calorimetry) thermogram;
   b) the nitrile rubber or rubbers S1 have (i) an acrylonitrile fraction of greater than or equal to 35% and (ii) a static glass transition temperature, in the DSC thermogram, of greater than or equal to −20° C.;
   c) the nitrile rubber or rubbers S2 have (i) an acrylonitrile fraction of greater than 25% and less than 35% and (ii) a static glass transition temperature, in the DSC thermogram, of less than −20° C.; and
   d) the nitrile rubber or rubbers S3 have (i) an acrylonitrile fraction of less than or equal to 25% and (ii) a static glass transition temperature, in the DSC thermogram, of less than or equal to −35° C.

2. The heat-activatable adhesive sheet of claim 1, wherein the weight fraction of the nitrile rubber or rubbers S1 is between 5% and 50% by weight, based on the total amount of nitrile rubber.

3. The heat-activatable adhesive sheet of claim 1, wherein the weight fraction of the nitrile rubber or rubbers S2 is between 10% and 90% by weight, based on the total amount of nitrile rubber.

4. The heat-activatable adhesive sheet of claim 1, wherein the weight fraction of the nitrile rubber or rubbers S3 is between 5% and 50% by weight, based on the total amount of nitrile rubber.

5. The heat-activatable adhesive sheet of claim 1, wherein the weight fraction of the reactive resin or resins is between 30% and 75% by weight, based on the weight of the total mixture comprising the nitrile rubbers and the reactive resin or resins.

6. The heat-activatable adhesive sheet of claim 1, wherein the reactive resins are selected from the group consisting of epoxy resins, novolak resins, melamine resins, terpene-phenolic resins, phenolic resins, polyisocyanate-based resins and mixtures thereof.

7. The heat-activatable adhesive sheet of claim 1, wherein said adhesive further comprises crosslinkers, accelerants or both.

* * * * *